(12) United States Patent
Müller

(10) Patent No.: US 6,494,311 B2
(45) Date of Patent: Dec. 17, 2002

(54) METHOD AND APPARATUS FOR CHANGING THE POSITION OF CHAINS OF SAUSAGES

(75) Inventor: Gerhard Müller, Schemmerhofen (DE)

(73) Assignee: Albert Handtmann Maschinenfabrik GmbH & Co. KG, Bibrach (DE)

( * ) Notice: Subject to any disclaimer, the term of this patent is extended or adjusted under 35 U.S.C. 154(b) by 13 days.

(21) Appl. No.: 09/898,889

(22) Filed: Jul. 3, 2001

(65) Prior Publication Data

US 2002/0020605 A1 Feb. 21, 2002

(30) Foreign Application Priority Data

Jul. 10, 2000 (DE) .......................... 100 33 494

(51) Int. Cl.[7] .................. B65G 15/24; B65G 17/26; B65G 37/00; A22C 11/00
(52) U.S. Cl. .................... 198/607; 198/606; 452/51
(58) Field of Search ............... 198/606, 607, 198/617; 452/56, 47, 48, 46, 51

(56) References Cited

U.S. PATENT DOCUMENTS

| | | | | |
|---|---|---|---|---|
| 4,192,639 A | * | 3/1980 | Jones, Jr. .................... | 198/607 |
| 4,218,003 A | * | 8/1980 | Plewa et al. .................. | 452/51 |
| 4,494,276 A | * | 1/1985 | Trottmann .................... | 452/51 |
| 5,145,451 A | * | 9/1992 | Staudenrausch ............. | 452/46 |
| 5,163,864 A | * | 11/1992 | Burger et al. ................. | 452/51 |
| 6,056,635 A | * | 5/2000 | Vermeer et al. .............. | 452/46 |

FOREIGN PATENT DOCUMENTS

DE  3911859  10/1990

* cited by examiner

*Primary Examiner*—Christopher P. Ellis
*Assistant Examiner*—Gene O. Crawford
(74) *Attorney, Agent, or Firm*—Marshall, Gerstein & Borun

(57) ABSTRACT

A method of and apparatus for changing the position of chains of sausages in sausage production processes with two endless conveying belts which convey the sausages of the chain of sausages over a first length in a first direction and which then deflect the chain of sausages into a second direction and convey it over a second length in said second direction, the distance between the conveying belts being chosen such that it is larger during transport in said second direction than during transport in said first direction, for use in transferring a chain of sausages from a twist-off station to a suspension station.

17 Claims, 4 Drawing Sheets

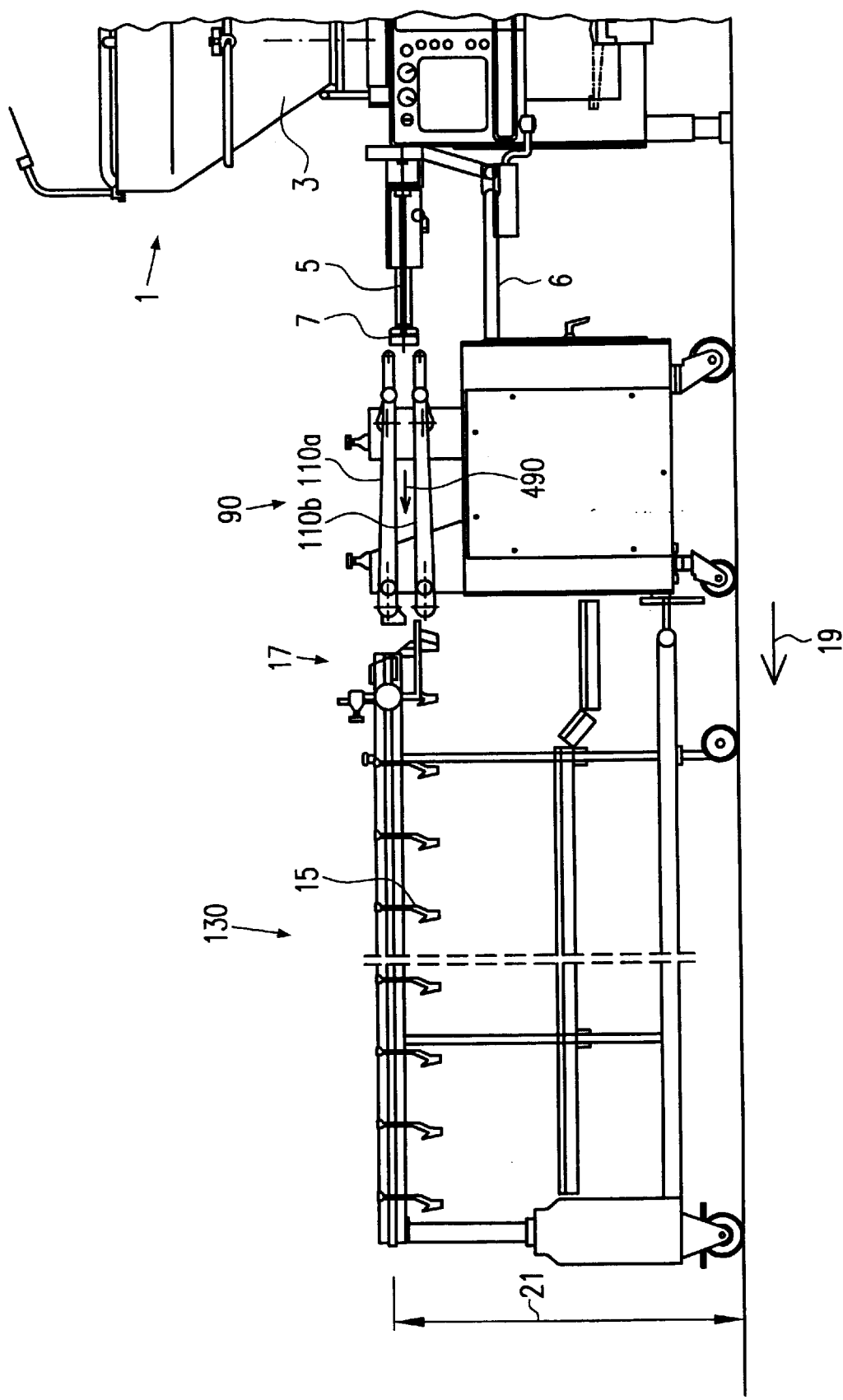

METHOD AND APPARATUS FOR CHANGING THE POSITION OF CHAINS OF SAUSAGES

FIELD OF THE INVENTION

The present invention relates to a method and an apparatus for changing the position of chains of sausages in sausage production processes making use of two endless conveying belts which are arranged in parallel, and to the use of said method and apparatus for transferring chains of sausages from a twist-off station to a suspension station.

BACKGROUND OF THE INVENTION

In sausage production processes, sausages are produced in the form of chains of sausages. The sausage meat is pressed into the sausage skin in a stuffing machine. The sausage skin is twisted off at predefined intervals so as to form individual sausages which are interconnected at the twist-off points after the fashion of a chain. Subsequent to the twist-off unit, the chains of sausages are introduced e.g. between two conveying belts which transport the chain of sausages away from the twist-off station at a defined speed. Due to the predefined speed, the length of a sausage between two twist-off points is defined. The chain of sausages can be transferred from the conveying belts to a suspension station where the chain of sausages is attached to suitable hooks at individual twist-off points thereof such that it takes up little space. With the aid of these hooks, the chain of sausages can then be transported away on suitable rails.

The chain of sausages must be knotted together at the sausage skin end. If the sausage skin tears or bursts, an operator must also be able to take action. This often necessitates that the operator works below the suspension hooks with a stoop.

The height above the floor at which the chain of sausages is discharged from the twist-off unit is predetermined by the structural design of the stuffing machine. This height should not be chosen too high so that the stuffing machine can still be filled easily. In addition, an excessively high level of support is not desirable for reasons of safety.

SUMMARY OF THE INVENTION

It is the object of the present invention to provide a method and an apparatus which permit improved handling of the machine.

In the case of the method according to the present invention, the chain of sausages is taken hold of by two endless conveying belts subsequent to the twist-off station; by means of these conveying belts the chain of sausages is transported away, initially without any change of direction. In a deflection area, the conveying belts are deflected into a second direction so as to convey the chain of sausages in a second direction at an oblique angle to a higher level. The distance between the conveying belts in the area of transport in said second direction is larger than the distance between the conveying belts in the area of transport in said first direction.

In the deflection area, the path of movement of one conveying belt is shorter than the path of movement of the other conveying belt. This has the effect that the conveying belts are longitudinally displaced relative to one another in the deflection area in the direction of movement. If a sausage portion is located between the conveying belts, friction may be caused by this longitudinal displacement, which may injure the sausage portion. By increasing the distance in the second area, in which the chain of sausages is conveyed in the second direction, the distance between the conveying belts will increase in the deflection area. Also this will contribute to a reduction of the friction acting on the sausage portions, whereby the risk of injuries will be reduced.

In the area in which transport takes place in the first direction, the distance between the conveying belts may correspond to the diameter of the sausage. If the distance in said area of transport in the first direction is, however, chosen such that it is smaller than the desired stuffing diameter, it will be guaranteed that the chain of sausages is safely held between the conveying belts during the twist-off process. In this way, the respective sausage is reliably taken hold of and transported. Reliable taking over of the chain of sausages by the conveying belts is guaranteed, when the chain of sausages is conveyed over a certain length in said first direction, i.e. when the transport path in said first direction is chosen such that also longer sausages can be taken hold of safely. In practice, a conveying length of at least 15 cm in said first direction proved to be suitable for all the conventional different sausage lengths.

The chain of sausages can be removed from the second area. According to an advantageous embodiment of the method, the area of transport in said second direction is followed by another deflection area in which the chain of sausages is deflected from said second direction into a third direction, which is parallel to said first direction. By means of this method, the chain of sausages is therefore displaced parallel to its original direction of transport. If the chain of sausages is e.g. horizontally introduced between the conveying belts, it can be raised to a higher level by said advantageous method, and it will be discharged from the conveying belts again in parallel.

For guaranteeing a reliable transfer to a subsequent station, it will be advantageous when the distance between the conveying belts is smaller in the area of transport in said third direction than in the area of transport in said second direction.

A careful transfer will be possible when the distance in the area of transport in said third direction is larger than or equal to the stuffing diameter of a sausage portion.

It will be advantageous when the transport length in said third direction is again chosen such that it will suffice for all conventional sausage lengths (also in this case at least approx. 15 cm) so as to permit transfer with the correct orientation.

An apparatus according to the present invention for carrying out the method according to the present invention comprises two parallel endless conveying belts comprising a first area for conveying the chain of sausages in a first direction, the conveying belts extending at a first distance from one another in said first area, a first deflection area in which the conveying belts are deflected parallel to one another from said first direction into a second direction, a second area for conveying said chain of sausages in a second direction, the conveying belts extending at a second distance from one another in said second area, said second distance being larger than said first distance.

The apparatus according to the present invention can be implemented such that it is adapted to convey sausages having a defined length and a defined diameter. It will, however, be advantageous to provide adjustment means with the aid of which the distances in the first area and in the second area and in the third area, respectively, can be adjusted so that sausage diameters of different dimensions can be processed.

The endless conveying belts can be driven by individual motors operating at matched speeds. A particularly simple embodiment is, however, an embodiment in the case of which the two conveying belts are driven with the aid of a suitable gear unit by the same motor. This will guarantee a synchronous movement.

BRIEF DESCRIPTION OF THE DRAWINGS

One embodiment of the apparatus according to the present invention and the execution of the method according to the present invention are explained on the basis of the figures enclosed, in which:

FIG. 5 shows a conventional sausage processing means.

DETAILED DESCRIPTION OF THE INVENTION

Figure 1:
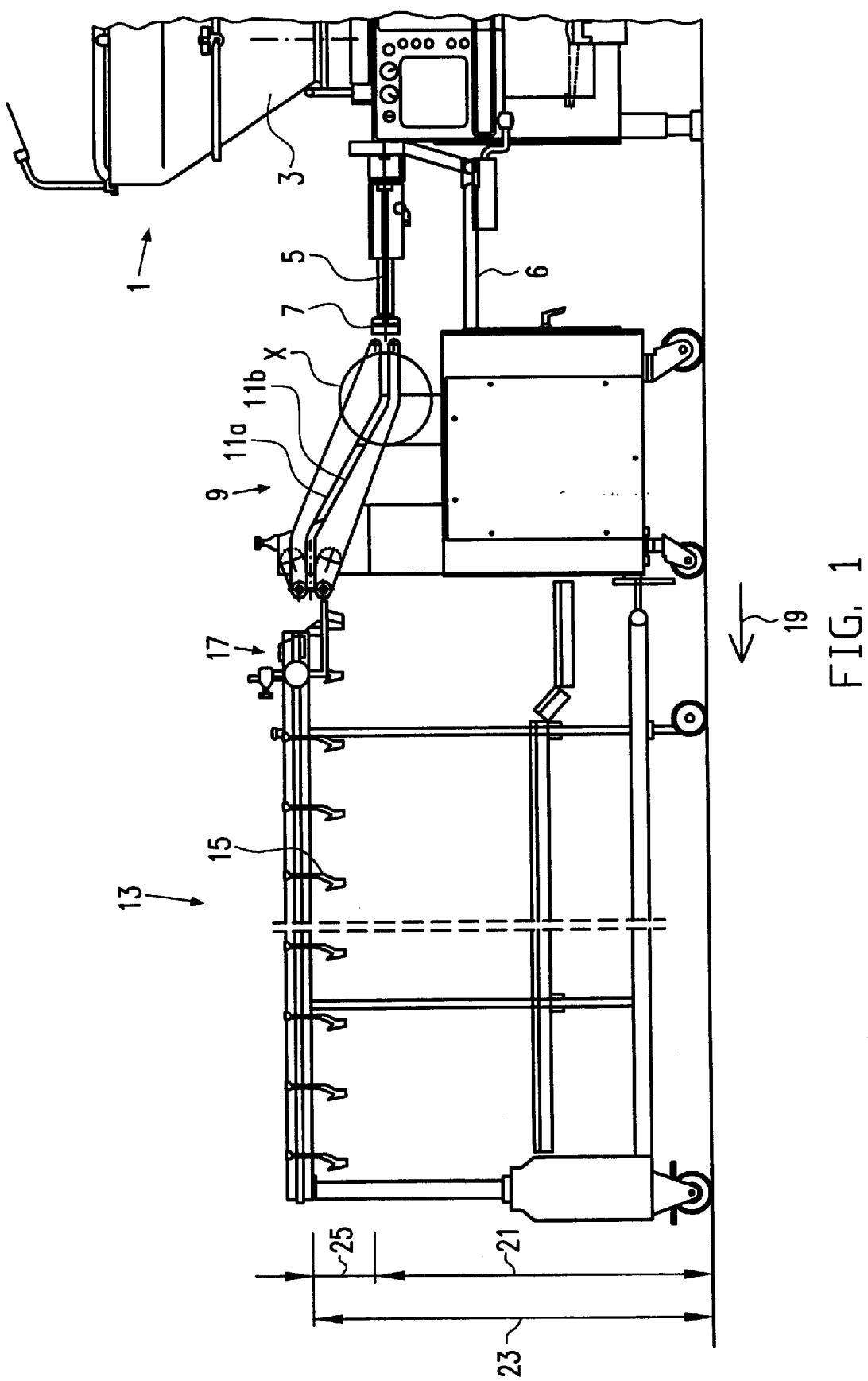
FIG. 1 shows an apparatus according to the present invention carrying out a sausage processing operation.

FIG. 5 shows part of a known sausage processing line. Reference numeral 1 stands for a stuffing machine for stuffing sausage skins with sausage meat. The sausage meat is fed through a hopper 3 and ejected through a charging pipe 5 e.g. by means of a vane pump in the manner known. The charging pipe 5 has applied thereto a tubular sausage skin which is pulled off by the stuffing material ejected. Reference numeral 7 stands for a brake ring mechanism and twist-off mechanism, respectively. The sausage skin filled with the sausage meat passes through this twist-off mechanism and is taken hold of by the conveying belts 110a, 110b, which are implemented as endless belts and which define between them a channel for the sausages. The endless belts 110a, 110b are driven such that the sausages are moved in the direction of transport 490. This transport unit is connected to the stuffing machine via a connection 6 so as to achieve a synchronous movement. Whenever the portion for one sausage has passed the twist-off mechanism 7, the charging pipe 5 having the tubular sausage skin applied thereto and, possibly, the twist-off mechanism will rotate so as to produce a twist-off point in the sausage strand. In the course of this process, the stuffing material which has already been ejected into the tubular sausage skin is prevented from rotating by means of the conveying belts 110a, 110b. In this way, a separation point is formed between the sausages. The thus formed chain of sausages is advanced by the transport unit 90 in the horizontal direction 490 and arrives at the suspension unit 130. This suspension unit 130 comprises suspension hooks 15 and a threading unit 17. The sausage strand emerges from the transport unit 90 between the two conveying belts 110a, 110b and has its twist-off points attached to the suspension hooks 15 in the threading unit 17. Due to the fact that further parts of the sausage strand continue to arrive and continue to be attached constantly, the suspension hooks 15 are pushed together so that a spiral sausage strand will be formed. The overall transport direction of the sausage meat and of the sausage portions, respectively, is designated by reference numeral 19. The approximate height at which the sausage strand moves in the whole arrangement is designated by reference numeral 21. Subsequent to the suspension unit 130, the sausage strand, which has been spirally pushed together, is removed and/or advanced to further processing and packing stations.

FIG. 1 shows the corresponding part of a sausage processing line with a transport unit 9 according to the present invention. Identical elements are designated by the same reference numerals as in the case of the known arrangement according to FIG. 5. In FIG. 1 the conveying belt (middle) of the suspension unit 13 is arranged such that it extends at a height 23, e.g. approx. 130 cm, above the floor, whereas the height 21 at which the charging pipe 5 and of the twist-off mechanism 7, respectively, extend may be approx. 105 cm. This results in a difference in height 25 of approx. 25 cm; it goes without saying that these figures are only mentioned by way of example.

The embodiment 9 of the transport device according to the present invention, which is located between the twist-off mechanism 7 and the suspension unit 13, comprises conveying-belt areas that extend at an oblique angle upwards.

Figure 2:
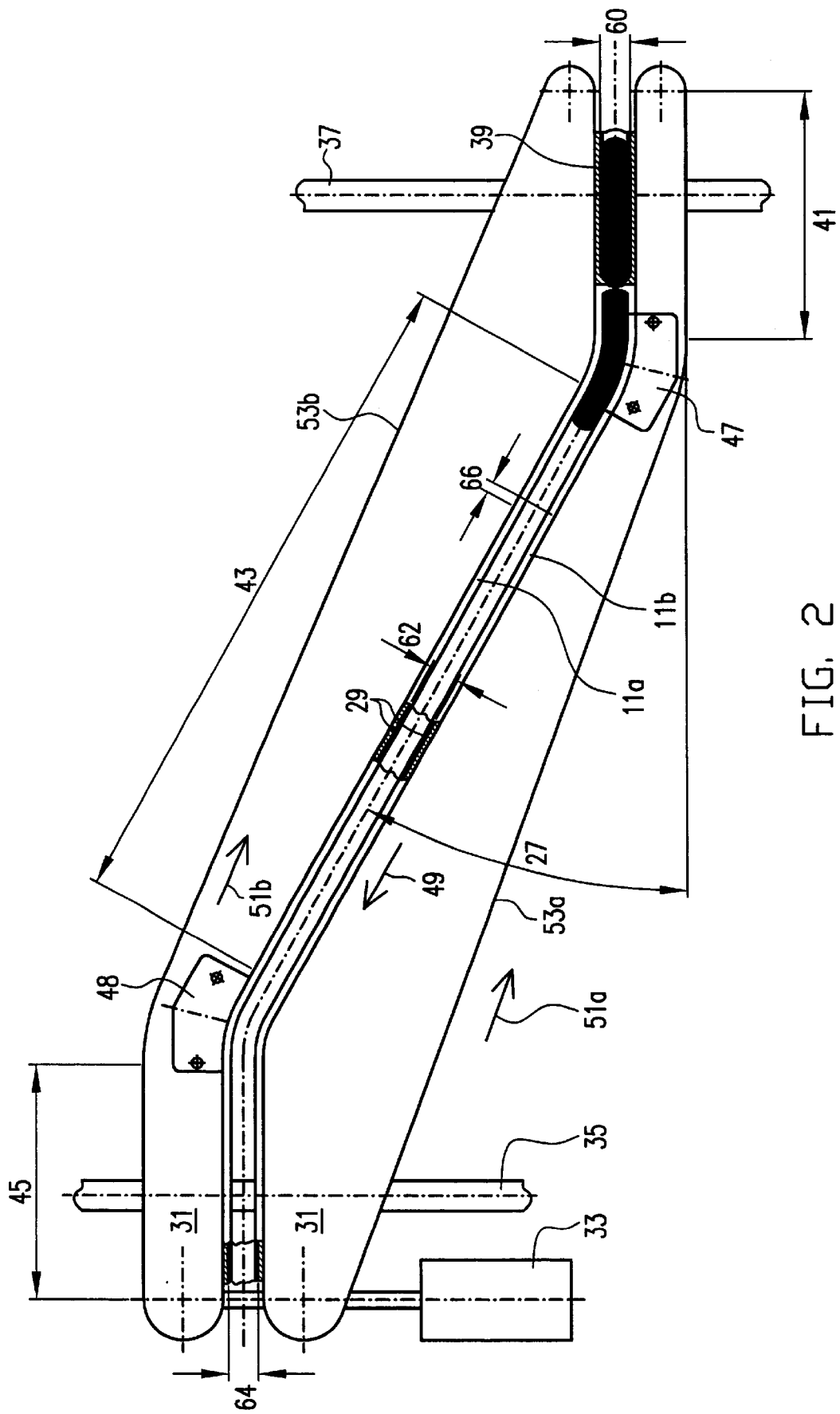
FIG. 2 shows a detail of FIG. 1, scaled-up.

FIG. 2 shows the area of the conveying belts 11a and 11b of the embodiment 9 according to the present invention in detail. The conveying belts 11a and 11b are provided with profiled linings 29, which are only shown in outlines in FIG. 2 and which serve to hold the sausages safely. The endless conveying belts 11a, 11b are guided on guide rails 31 and are both driven by one motor 33. Reference numeral 39 stands for an incoming sausage. In a first area 41 the conveying belts 11a, 11b are arranged in such a way that they convey horizontally in direction 19 over a certain distance, said distance being in practice slightly longer than 15 cm. In said area 41, the distance between the conveying belts 11a, 11b is designated by reference numeral 60 and slightly smaller than the diameter of a sausage 39, which typically ranges from 1 to 5 cm. Subsequent to said area 41, the conveying belts 11a, 11b move upwards in direction 49 at the angle 27, said angle being e.g. 30°. in the oblique area 43, the distance 62 between the conveying belts 11a, 11b is slightly larger than the distance 60 in the first area 41. After the oblique area 43, the conveying belts 11a, 11b are again moved into the horizontal transport direction by the guide rails 31. The conveying belts 11a, 11b run again parallel in direction 19 over an area 45. In the third area 45, the distance 64 between the conveying belts 11a, 11b is again smaller than the distance 62 in the oblique area 43. The absolute size of the distance 64 in the third area 45 can, however, be larger than the filling diameter of a sausage. Numerals 35 and 37 designate spindle mechanisms, which are shown schematically and by means of which the distance between the conveying belts 11a, 11b can be adjusted to various sausage diameters, the typical range of adjustment being between approx. 10 and approx. 50 mm.

In the return areas 53a and 53b, the endless belts 11a, 11b are returned by the guide rails 31 along the directions 51a, 51b.

In the oblique area 43, the conveying belts 11a, 11b are displaced relative to one another. Two points on the conveying belts 11a and 11b which are located in directly opposed relationship to one another in the first and third areas 41 and 45 are arranged at a longitudinal distance 66 from one another in the direction of movement 49 in the oblique area 43, said longitudinal distance 66 originating from the fact that the path which the upper conveying belt 11a has to travel in the first deflection area between the first area 41 and the oblique area 43 is shorter than the path travelled by the lower conveying belt 11b.

The deflection of the conveying belts 11a, 11b is achieved by means of the guide rails 31 which are provided with respective guide members. Specially, guide rails 47, 48 are provided, which guarantee that the respective outer conveying belts 11b and 11a are guided in the deflection areas between said areas 41 and 43 on the one hand and 43 and 45 on the other.

Figure 3:
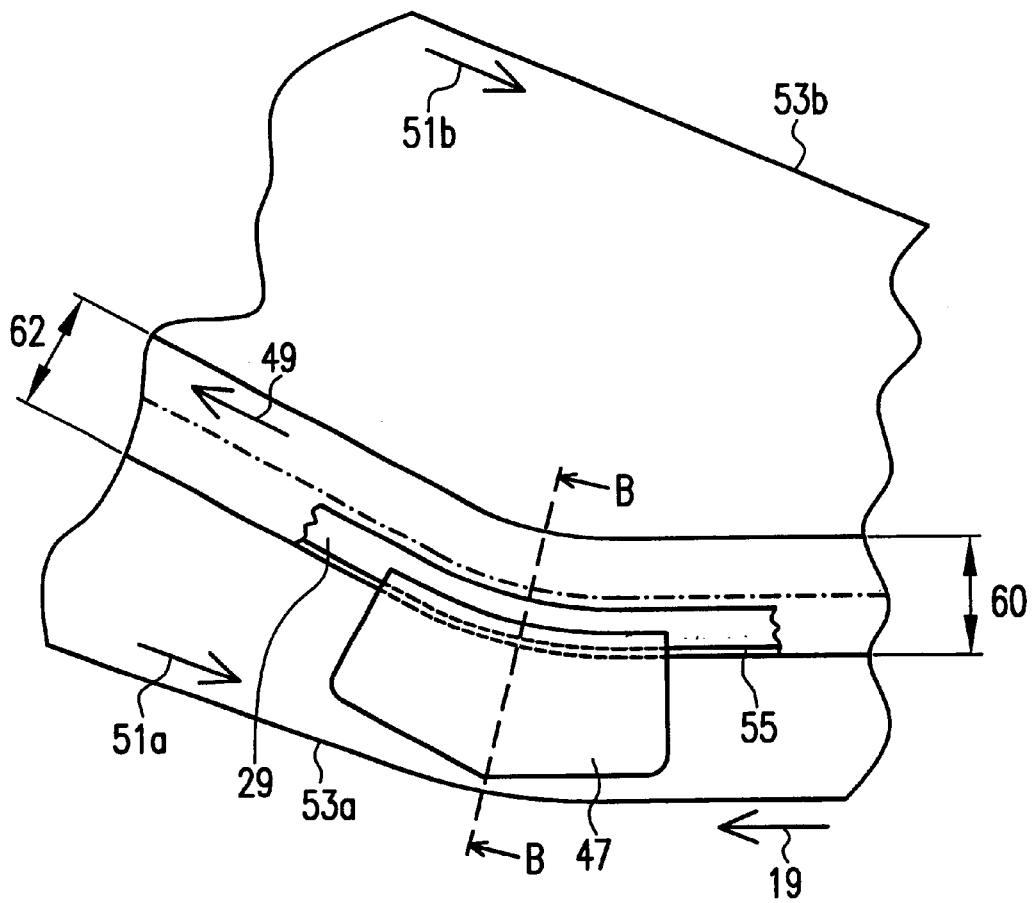
FIG. 3 shows detail X of FIG. 1 in the first deflection area.

The curved rail 47 is shown in detail in FIG. 3. The curved rail 48 is implemented analogously.

In FIG. 3, the profiled lining 29 for the conveying belt 11b is only partially outlined. The profiled lining of conveying belt 11a is not shown. Another component which is shown only schematically in FIG. 3 is an underlying support area 55 which will be explained in detail making reference to FIG. 4. Both the profiled lining 29 and the underlying support area 55 are shown in FIG. 3 only in the area of the curved rail 47; they extend, however, along the whole endless conveying belts 11b and 11a, respectively.

Figure 4:
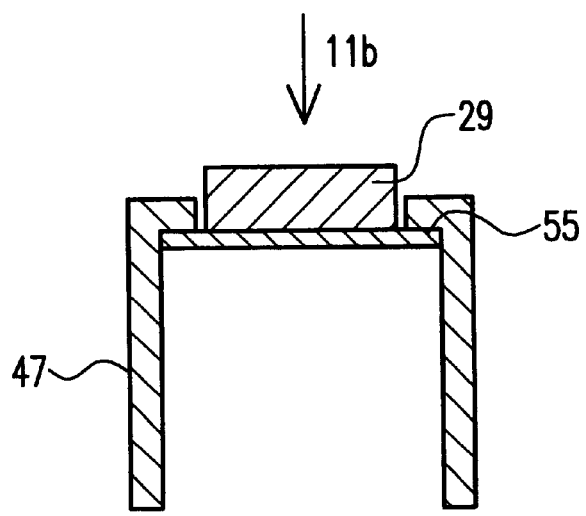
FIG. 4 shows a sectional view along the sectional area B in FIG. 3.

FIG. 4 shows a section through the guide rails in the direction of sight B of FIG. 3.

The conveying belt 11b consists of an underlying support area 55 provided with the profiled lining 29. The underlying support area 55 engages a shoulder of the guide rail 47 from below so that reliable guiding is also guaranteed in the outer curve area.

The apparatus according to the present invention can be employed as follows.

To begin with, the distance between the conveying belts 11a, 11b is adjusted with the aid of the spindles 35, 37 in the third area 45 and in the first area 41. In so doing, the distance 60 in the first area is chosen such that it is slightly smaller than the desired sausage diameter and the distance in area 45 is chosen such that it corresponds approximately to the stuffing diameter; +/−tolerances in the range of 1–3 mm are possible depending on the respective diameter. The distance 62 between the conveying belts 11a, 11b in the oblique area 43 results from the adjustment of the distances 60 and 64 in the first and third areas.

The guide rails 31 of the conveying belts 11a, 11b are, however, positioned and arranged in such a way that the distance 62 between the conveying belts in the second area 43 is larger than the distance 60 in the first area 41 as well as than the distance 64 in the third area.

The stuffing machine 1 is filled through the hopper 3. The charging pipe 5 has a tubular sausage skin applied thereto. The sausage meat is discharged from the stuffing machine and, passing through the charging pipe, it enters the tubular sausage skin where it is seized by the conveying belts 11a, 11b in the first area 41 and transported away in direction 19.

With the aid of the twist-off mechanism 7 a separation point is produced after each desired sausage length in the manner known. A chain of sausages is produced in this way, which is advanced by the transport unit 9. The chain of sausages is deflected by the angle 27 in direction 43 and moves at an oblique angle upwards. The slightly larger distance 62 between the conveying belts 11a, 11b in the second area 43 guarantees that the displacement 66 occurring between the conveying belts 11a, 11b due to the non-identical paths of movement of said conveying belts 11a, 11b in the deflection area between the first area 41 and the second area 43 will not cause any injuries in the respective sausage skin, since the friction will then only be very low.

The risk of injuries is also reduced in the deflection area itself, since the distance between the conveying belts 11a, 11b increases from area 41 to area 43.

Subsequent to the area 43, the chain of sausages is again moved into a horizontal position by the conveying belts 11a, 11b. The chain of sausages is conveyed horizontally over the third area 45 and transferred to the suspension unit 13, where it is attached to the suspension hooks 15 by means of the threading unit 17 in the manner known.

Whereas the first area of the transport unit 9 extends on a level 21 above the floor which corresponds to the level of the charging pipe 5 of the sausage machine, the sausage strand is raised by the height 25 to the higher level 23 by the oblique movement upwards in the area 43.

The height 23 can be chosen such that an operator can easily work below the suspension unit 13 so as to be able to knot sausage ends together or to take action in the case of an injured or torn sausage skin material. The height of the stuffing machine 1 need not even be changed in the case of these operations so that the machine can still be filled easily through the hopper and so that safety regulations with respect to the height of the components of the machine will be observed.

The embodiment 9 according to the present invention can be used at any location at which the direction of transport of the sausage strand is to be changed. In a particularly advantageous manner it can, however, be used in the form described, where it is used for raising the sausage strand from the low level 21 of the charging pipe 5 to a higher level 23 for the suspension unit 13 so that it is there easily possible to work below the plant.

I claim:

1. A method of changing the position of chains of sausages in sausage production processes with two endless conveying belts (11a, 11b) which are arranged in parallel, comprising the steps of: p1 transferring the sausages (39) of the chain of sausages in a first direction to a position between the conveying belts (11a, 11b), conveying said sausages (39) by said conveying belts over a first length (41) in said first direction, deflecting said sausages (39) by said conveying belts (11a, 11b) into a second direction (49), conveying said sausages (39) over a second length (43) in said second direction (49) to a higher level, and choosing the distance (62) between the conveying belts to be larger during transport in said second direction (49) than during transport in said first direction.

2. A method according to claim 1, wherein the distance (60) between the conveying belts (11a, 11b) during transport in said first direction is smaller than or equal to the stuffing diameter of the sausages (39).

3. A Method according to claim 1, and conveying the sausages horizontally during transport in said first direction.

4. A method according to claim 1, and the step of transferring a chain of sausages from a twist-off station (7) to a suspension station (13).

5. A method according to claim 1, and, subsequent to the area of transport in said second direction (49), the steps of deflecting the sausages by the conveying belts (11a, 11b) in a third direction which is parallel to said first direction, transporting the sausages in said third direction over a third length (45), and choosing the distance (64) between said conveying belts (11a, 11b) during transport in said third direction to be smaller than the distance (62) between the conveying belts (11a, 11b) during transport in said second direction.

6. A method according to claim 5, wherein the distance between the conveying belts (11a, 11b) during transport in said third direction is approximately equal to a stuffing diameter of the sausages.

7. An apparatus for changing the position of a chain of sausages in sausage production processes with two endless conveying belts (11a, 11b), comprising in combination:

a first area (41) for conveying the chain of sausages in a first direction, the conveying belts (11a, 11b) extending at a first distance from one another in said first area (41), a first deflection area in which the conveying belts (11a, 11b) are deflected parallel to one another from said first direction into a second direction (49), a second area (43) for conveying said chain of sausages to a higher level in said second direction, the conveying belts (11a, 11b) extending at a second distance (62) from one another in said second area, said second distance (62) being larger than said first distance (60).

8. An apparatus according to claim 7, wherein said first distance (60) is smaller than or equal to a diameter of the sausages (39) to be transported.

9. An apparatus according to claim 7, wherein the conveying belts (11a, 11b) are driven by the same motor (33).

10. An apparatus according to claim 7, wherein said first direction is a horizontal direction.

11. An apparatus according to claim 7, wherein for transferring a chain of sausages, the apparatus extends between a twist-off station (7) and a suspension station (13).

12. An apparatus according to claim 7, comprising an adjustment means (37) for adjusting said first distance (60).

13. An apparatus according to claim 7, comprising an adjustment means for adjusting said second distance (62).

14. An apparatus according to claim 7, comprising a second deflection area in which the conveying belts (11a, 11b) are deflected parallel to one another from said second direction (49) to a third direction which is parallel to said first direction, and a third area (45) for conveying the chain of sausages in said third direction, the conveying belts (11a, 11b) being spaced apart by a third distance (64), which is smaller than said second distance (62), in said third area.

15. An apparatus according to claim 14, wherein said third distance (64) corresponds approximately to the diameter of the sausages (39) to be conveyed.

16. An apparatus according to claim 14, comprising an adjustment means (35) for adjusting said third distance (64).

17. An apparatus according to claim 16, 12, or 13, wherein said adjustment means (35, 37) comprises a spindle.

* * * * *

UNITED STATES PATENT AND TRADEMARK OFFICE
CERTIFICATE OF CORRECTION

PATENT NO. : 6,494,311 B2
APPLICATION NO. : 09/898889
DATED : December 17, 2002
INVENTOR(S) : Gerhard Müller It is certified that error appears in the above-identified patent and that said Letters Patent is hereby corrected as shown below:

<u>In the Claims</u>:

Claim 1
Column 6, Line 30      Please delete "of:  p1 transferring" and replace with --of:  transferring--.

Claim 6
Column 6, Line 63      Please delete "to a stuffing" and replace with --to the stuffing--.

Claim 8
Column 7, Line 15      Please delete "to a diameter" and replace with --to the diameter--.

Signed and Sealed this

Twenty-ninth Day of May, 2007

JON W. DUDAS
*Director of the United States Patent and Trademark Office*